US008477756B2

(12) United States Patent
Guillouard et al.

(10) Patent No.: US 8,477,756 B2
(45) Date of Patent: Jul. 2, 2013

(54) METHOD FOR TRANSMISSION OF DATA AND METHOD FOR CORRESPONDING RECEPTION

(75) Inventors: Samuel Guillouard, Chantepie (FR); Patrick Fontaine, Rennes (FR); Charline Guguen, Bourgbarre (FR)

(73) Assignee: Thomson Licensing, Boulogne-Billancourt (FR)

( * ) Notice: Subject to any disclaimer, the term of this patent is extended or adjusted under 35 U.S.C. 154(b) by 648 days.

(21) Appl. No.: 12/590,980

(22) Filed: Nov. 17, 2009

(65) Prior Publication Data
US 2010/0220671 A1    Sep. 2, 2010

(30) Foreign Application Priority Data
Nov. 21, 2008   (FR) ...................................... 0806545

(51) Int. Cl.
*H04B 7/212* (2006.01)
*H04W 72/00* (2009.01)

(52) U.S. Cl.
USPC .......................................... 370/347; 455/450

(58) Field of Classification Search
USPC ......................................................... 370/347
See application file for complete search history.

(56) References Cited

U.S. PATENT DOCUMENTS

| | | | |
|---|---|---|---|
| 6,477,385 B1 * | 11/2002 | Hara ............................. | 455/502 |
| 6,480,483 B2 * | 11/2002 | Yahata et al. ................. | 370/350 |
| 6,975,877 B1 * | 12/2005 | Dergun et al. ................ | 455/502 |
| 7,573,850 B2 * | 8/2009 | Li et al. ......................... | 370/329 |
| 7,720,485 B2 * | 5/2010 | Jin et al. ........................ | 455/450 |
| 8,086,179 B2 * | 12/2011 | Song ............................. | 455/63.1 |
| 2005/0195768 A1 * | 9/2005 | Petite et al. .................... | 370/335 |
| 2008/0175191 A1 * | 7/2008 | Obermanns .................... | 370/329 |
| 2009/0312027 A1 * | 12/2009 | Foschini et al. ............... | 455/446 |
| 2010/0034239 A1 * | 2/2010 | Keshavarzian et al. ....... | 375/134 |
| 2010/0220671 A1 * | 9/2010 | Guillouard et al. ........... | 370/329 |

FOREIGN PATENT DOCUMENTS

| | | |
|---|---|---|
| EP | 1209820 | 5/2002 |
| WO | WO2008/095523 | 8/2008 |

OTHER PUBLICATIONS

Ericsson; "R3-061505: SFN area confirguration for E-MBMS" Internet Citation p. 1,1ine 1, p. 2, line 2 Oct. 13, 2006.

* cited by examiner

*Primary Examiner* — Guang Li
(74) *Attorney, Agent, or Firm* — Tutunjian & Bitetto, P.C.

(57) ABSTRACT

The invention relates to a method for transmission of data in a wireless network comprising a plurality of base stations broadcasting data at a same frequency and a plurality of mobile terminals. In order to overcome inter-cell transfer at the level of mobile terminals, the method comprises:
assignments of first and second sub-sets of base stations at respectively at least a first and at least a second mobile terminal, the assignments varying in time according to first and second parameters, the two sub-sets having at least one base station in common and each at least having a specific base station,
synchronized transmissions of respectively the base stations of the first and second sub-set of first and second specific data modulated with first and second modulations to respectively the at least first and second mobile terminals.
The invention also relates to the corresponding method for reception of data.

8 Claims, 5 Drawing Sheets

METHOD FOR TRANSMISSION OF DATA AND METHOD FOR CORRESPONDING RECEPTION

This application claims the benefit, under 35 U.S.C. §119 of EP patent application Ser. No. 0806545, filed Nov. 21, 2008.

1. SCOPE OF THE INVENTION

The invention relates to the domain of telecommunications and more specifically to the wireless transmission and reception of data in a system comprising more than one base station broadcasting data in a synchronous manner and at the same frequency.

2. PRIOR ART

According to the prior art, a mobile network, for example of type GSM (Global System for Mobile communication), WiMAX (based on the standard IEEE 802.16) or LTE (Long Term Evolution), of the 3GPP ($3^{rd}$ Generation Partnership Project) project, has cells each containing a base station. When a mobile terminal progresses in such a network, it is sometimes necessary that the mobile terminal passes from one cell to another without interruption to the service at the level of the mobile terminal, the transmission frequency varying from one cell to another. A mechanism enabling assurance of such continuity is commonly referred to as "handover". The "handover" can be available both as "hard handover" and as "soft handover"

In the case of "hard handover", when the mobile terminal passes from a first cell to a second cell, the communication with the first cell is interrupted before communication with the second cell begins. A disadvantage of "hard handover" is that if the "handover" fails, the communication between the base station and the mobile terminal is interrupted. In the case of "soft handover", the communication with the first cell is maintained for a given time slot although the communication with the second cell has already been initiated. A disadvantage of "soft handover" is that it requires a complexity of mobile terminal hardware that must be able to manage in parallel communications on several different frequency channels.

According to a technique known in the prior art called SFN (Single Frequency Network), several base stations transmit synchronously a single OFDM (Orthogonal Frequency Division Multiplexing) signal. In this way, a mobile terminal receives a combination of signals from several transmitters and decodes the combination thus obtained using the properties specific to OFDM for the cancellation of inter-symbol interference. The document entitled "Dynamic Single Frequency Networks" published by Magnus Eriksson in "IEEE Journal on selected areas in communications", volume 19, of 10 Oct. 2001, introduces the notion of DSFN (Dynamic Single Frequency Networks) based on the division of base stations of a network into several SFN groups, each SFN group comprising base stations simultaneously transmitting the same information on the same frequency channel. However, this document does not describe how to optimise the bandwidth in a network comprising more than one mobile terminals.

3. SUMMARY OF THE INVENTION

The purpose of the invention is to overcome the disadvantages of the prior art.

More specifically, the purpose of the invention is to enable more than one mobile terminals to move in a wireless network without service interruption, while optimizing use of the bandwidth.

The invention relates to a method for transmission of data in a wireless network, said network comprising a plurality of base stations and at least two mobile terminals, the plurality of base stations broadcasting data at a same frequency. In order to optimise the use of the bandwidth, the method comprises the following steps:

first assignment to at least a first mobile terminal of at least two base stations from among the plurality of base stations, forming a first sub-set of assigned base stations, the first assignment varying in time according to a first determined parameter belonging to a group of parameters, second assignment to at least a second mobile terminal of at least two base stations from among the plurality of base stations, forming a second sub-set of assigned base stations, at least one base station of the first sub-set belonging to the second sub-set, at least one base station of the first sub-set not belonging to the second sub-set, and at least one base station of the second sub-set not belonging to the first sub-set, the second assignment varying in time according to a second determined parameter belonging to a group of parameters, synchronized transmission, by each base station of said first sub-set, of first specific data modulated with a same first modulation schema intended for at least a first mobile terminal, and synchronized transmission, by each base station of said second sub-set, of second specific data modulated with a same second modulation schema intended for at least a second mobile terminal.

To each mobile terminal are assigned at least two base stations thus forming a virtual cell (one for each mobile terminal) of base stations for which the assignment varies is time, thus enabling each mobile terminal to be followed in its movements. A base station or base stations enter and/or exit the virtual cell according to determined parameters, the virtual cell thus follows the movement of the mobile terminal.

According to a specific characteristic, the method comprises a step of allocation of first physical channels to the first sub-set and second physical channels to the second sub-set, the first and second physical channels being distinct.

Advantageously, the first and second physical channels do not overlap.

According to another characteristic, the first and second parameters belong to the group comprising:

a number of assigned mobile terminals, a maximum number of assigned base stations, a link quality between a base station and the assigned mobile terminal, a bitrate efficiency of the base stations, and a localisation respectively of at least a first mobile terminal and at least a second mobile terminal.

According to a specific characteristic, the method comprises a step of suppression of the assignment of at least one base station of the first sub-set according to the first parameter and/or at least one base station of the second sub-set according to the second parameter.

The invention also relates to a method for reception of data in a wireless network, said network comprising a plurality of base stations and at least two mobile terminals, the plurality of base stations broadcasting data at a same frequency. The method for reception comprises the following steps:

first assignment to at least a first mobile terminal of at least two base stations from among the plurality of base stations, forming a first sub-set of assigned base stations, the first assignment varying in time according to a first determined parameter belonging to a group of parameters, second assignment to at least a second mobile terminal of at least two base stations from among the plurality of base stations, forming a second sub-set of assigned base stations, at least one base station of the first sub-set belonging to the second sub-set, at least one base station of the first sub-set not belonging to the second sub-set, and at least one base station of the second sub-set not belonging to the first sub-set, the second assignment varying in time according to a second determined parameter belonging to a group of parameters, reception by said at least first mobile terminal of the first specific data, transmitted synchronously and modulated with a same first modulation schema by each base station of the first sub-set, and reception by said at least second mobile terminal of the second specific data, transmitted synchronously and modulated with a same second modulation schema by each base station of the second sub-set.

According to a specific characteristic, the method comprises a step of allocation of first physical channels to the first sub-set and second physical channels to the second sub-set, the first and second physical channels being distinct.

Advantageously, the first and second physical channels do not overlap.

According to another characteristic, the first and second parameters belong to the group comprising:
a number of assigned mobile terminals,
a maximum number of assigned base stations,
a link quality between a base station and the assigned mobile terminal,
a bitrate efficiency of the base stations,
a localisation respectively of at least a first mobile terminal and at least a second mobile terminal.

According to a specific characteristic, the method comprises a step of suppression of the assignment of at least one base station of the first sub-set according to the first parameter and/or at least one base station of the second sub-set according to the second parameter.

4. LIST OF FIGURES

The invention will be better understood, and other specific features and advantages will emerge upon reading the following description, the description making reference to the annexed drawings wherein.

5. DETAILED DESCRIPTION OF THE INVENTION

Figure 1:
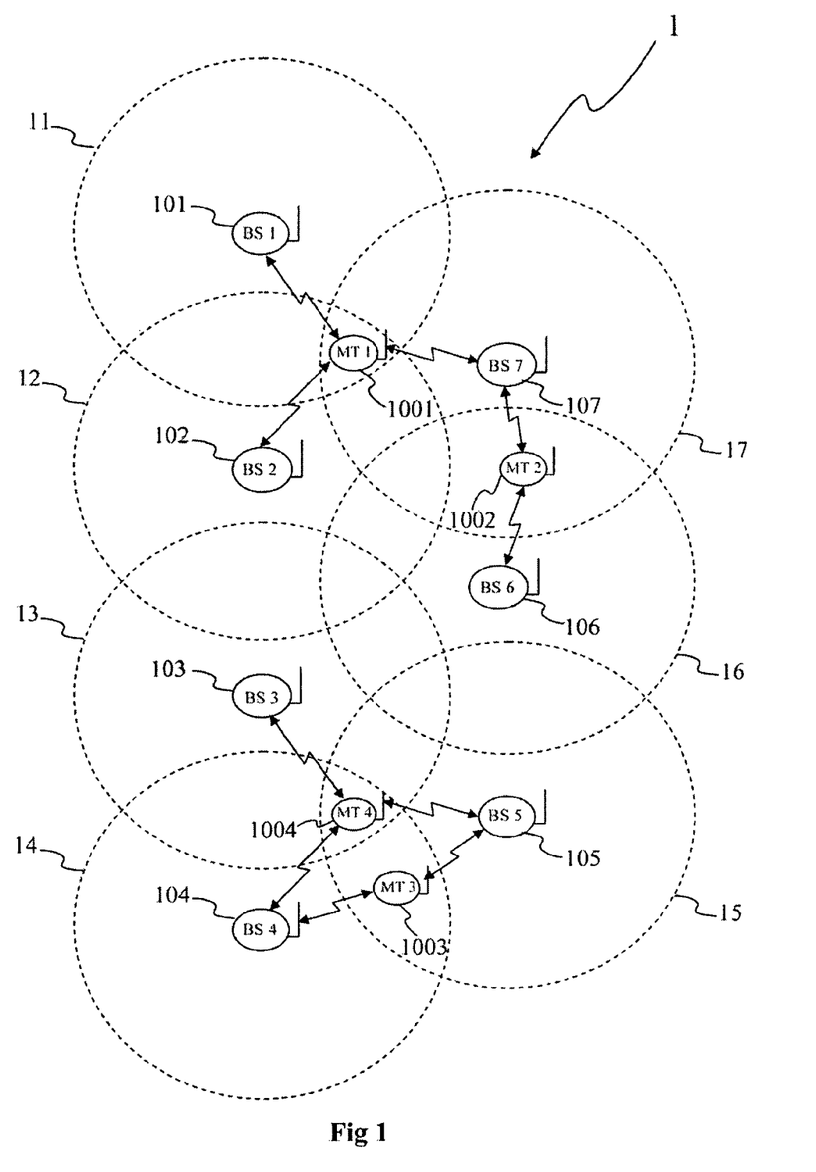
FIG. 1 shows a wireless network implementing more than one base stations and more than one mobile terminals, according to a particular embodiment of the invention, FIGS. 2 and 3 diagrammatically illustrate a respectively a base station and a mobile terminal of the system in FIG. 1, according to the invention.

FIG. 1 shows a wireless communications system 1 implementing several base stations 101, 102, 103, 104, 105, 106 and 107, and several mobile terminals 1001, 1002, 1003 and 1004 according to a particular embodiment of the invention. The base stations 101 to 107 transmit at a single frequency, that is to say that the base station operate at a single frequency (that is to say with a negligible difference in frequency with regard to the OFDM system considered, typically less then 1 Hz for a DVB-T (Digital Video Broadcasting—Terrestrial) type system). The transmission at a single frequency by the set of base stations of the network enables dispensing with any "handover" mechanism at the level of the mobile terminal. The base stations 101 to 107 and the mobile terminals 1001 to 1004 each have a single transmission antenna. The base stations 101, 102 and 107 are assigned to the mobile terminal 1001 and form a first sub-set of assigned base stations. The base stations 106, and 107 are assigned to the mobile terminal 1002 and form a second sub-set of assigned base stations. The base station 107 thus belongs to the first and second sub-sets of base stations. Two base stations 101 and 102 of the first sub-set do not belong to the second sub-set. A base station 106 of the second sub-set does not belong to the first sub-set. The base stations 104 and 105 are assigned to the mobile terminal 1003 and form a third sub-set of assigned base stations. The base stations 103, 104 and 105 are assigned to the mobile terminal 1004. the mobile terminals 1001 to 1004 are able to receive and decode the signals transmitted by the base stations 101 to 107 and the base stations 101 to 107 are able to receive and decode signals transmitted by the mobile terminals 1001 to 1004. The zones 11, 12, 13, 14, 15, 16 and 17 defined by the dotted circles represent interference zones of respectively each of the base stations 101 to 107. Inside each of these zones 11 to 17, the interferences are less than a given threshold value and the interferences are greater than a given threshold value outside of these zones 11 to 17.

Advantageously, the mobile terminals 1001, 1002, 1003 and 1004 of system 1 are portable devices, for example telephones or portable terminals adapted to receive and process broadcast services (for example voice or audio data restitution and/or video data display, or more generally restitution, storage or processing of multimedia data).

Advantageously, the base stations 101 to 107 of the system 1 are fixed devices. The base stations are high powered transmitters adapted to broadcast data over a wide coverage area or average or low powered base stations adapted to broadcast over a more restricted coverage area. According to a variant, one at least of the base stations 101 to 107 forms a system covering a "picocell" that is to say a small area, such as the interior of a building, a supermarket, a station, that is having a range of a few dozen meters (according to some embodiments, in a picocell, the range is advantageously less than 300 m). According to another variant, at least one of the base stations forms a system designed to cover a "femtocell" that is an area restricted to a smaller size than a picocell, such as some rooms of a house or building, one floor of a building, a plane, that is to say having a range of a few meters (according to some embodiments the range is advantageously less than 100 meters).

According to a variant, the base station 101 to 107 are of SISO (Single Input Single Output) type and have only a single antenna. The base stations form a synchronized network transmitting for the destination of a given mobile terminal a same content at a same frequency, that is to say the base stations operate on a single frequency (that is with a negligible deviation in frequency with respect to the OFDM system considered (typically less than 1 Hz for a DVB-T type system)) in a synchronous manner (that is with a negligible temporal deviation (for example less than 1 µs) and without temporal sliding of a signal transmitted by a base station with respect to another signal transmitted by another base station), the transmission frequency being synchronized on the different base stations, for example by the reception of a reference frequency provided by an external element (for example by GPS (Global Positioning System) satellite or terrestrial broadcast station of a reference time or frequency).

According to another variant, the base stations 101 to 107 are of MIMO type and each have a MIMO coder and several antennas transmitting a MIMO signal. According to this variant, the base stations also form a synchronized network transmitting a same content intended for a given mobile terminal at a same frequency.

Advantageously some of the base stations of the system 1 are of SISO type and some are of MIMO type. According to this variant, the base stations also form a synchronized network transmitting a same content intended for a given mobile terminal at a same frequency.

According to another embodiment, the base stations of the first, second, third and/or fourth base station sub-sets of the system 1 form a cooperative MIMO system in which the base stations possess indifferently one or more antennas. Such a cooperative MIMO system uses antennas distributed over several base stations, that is to say that the signal transmitted is distributed spatially between several antennas that can belong to several base stations of a single sub-set. The complete signal, with all the spatial streams, is combined in the air to be received by the mobile terminal to which are assigned the base stations of the considered sub-set. The base stations of such a cooperative MIMO system also form a synchronized network transmitting a same content intended for the considered mobile terminal at a same frequency.

According to another variant, some base stations of the system 1 are of cooperative MIMO type or not and the others are of SISO type.

Advantageously, at least one of the mobile terminals 1001 to 1004 is of MIMO type and has several antennas.

According to a variant, the zones 11 to 17 define the coverage zones of respectively each of the base stations 101 to 107.

Figure 2:
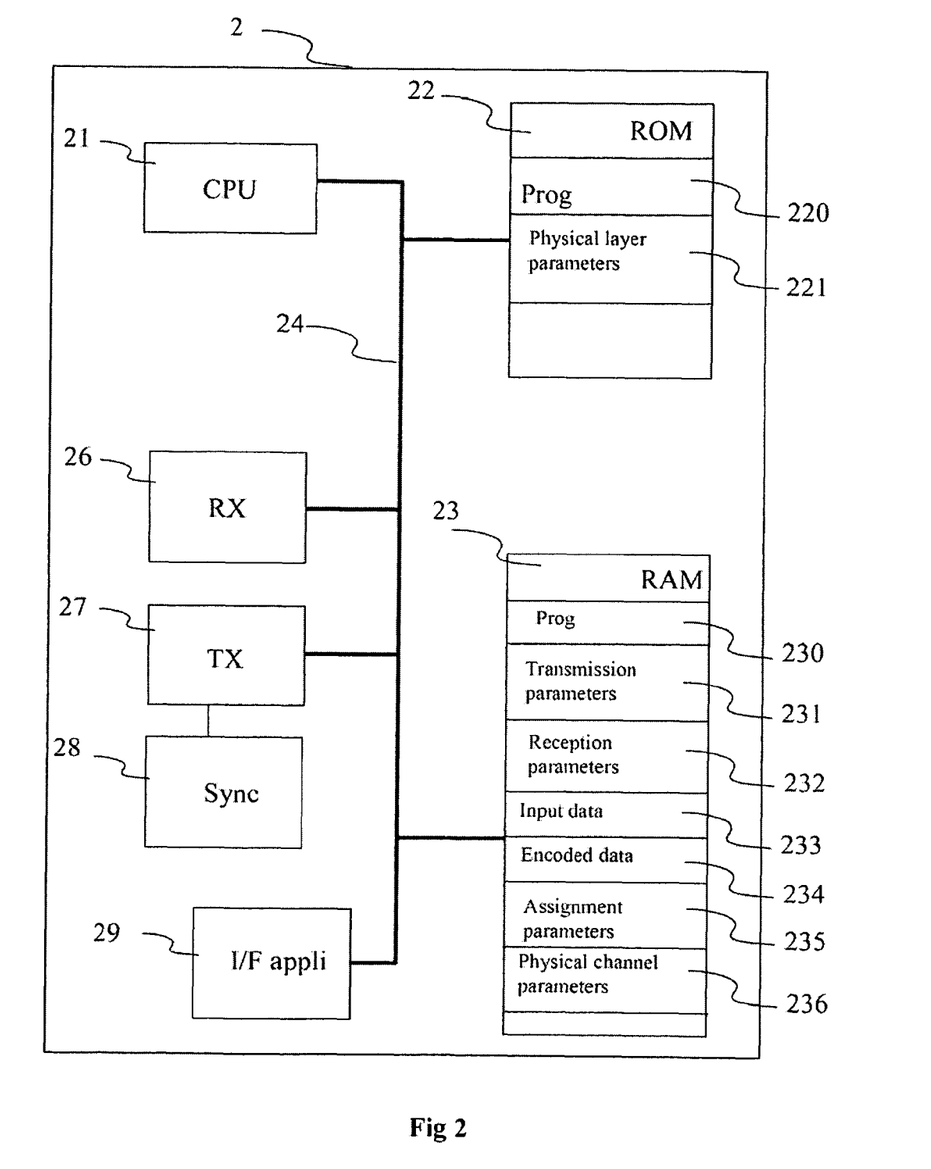

FIG. 2 shows schematically a hardware embodiment of a base station 2 corresponding for example to the base stations 101 to 107 of FIG. 1

The base station 2 comprises the following elements, connected to each other by a bus 24 of addresses and data, that also transports a clock signal:
- a microprocessor 21 (or CPU),
- a non-volatile memory of ROM (Read Only Memory) type 22,
- a Random Access Memory or RAM 23,
- a radio interface 26;
- an interface 27 adapted for the transmission of data (for example broadcasting of services or multipoint to point or point to point transmission) performing notably the functions of a coder and/or OFDM modulators,
- an interface 28 suitable for receiving the synchronisation signal and for synchronising the interface 27, and/or
- a MMI (Man Machine Interface) interface 29 or to a specific application suitable for displaying information for a user and/or inputting data or parameters (for example the setting of sub-carriers and data to be transmitted).

It is noted that the word "register" used in the description of memories 22 and 23 designates in each of the memories mentioned, a memory zone of low capacity (some binary data) as well as a memory zone of large capacity (enabling a whole programme to be stored or all or part of the data representing services received and to be broadcast).

The memory ROM 22 comprises in particular:
- a "prog" 220 program, and
- parameters 221 of physical layers.

The algorithms implementing the steps of the method specific to the invention and described hereafter are stored in the memory ROM 22 associated with the base station 2 implementing these steps. When powered up, the microprocessor 21 loads and runs the instructions of these algorithms.

The random access memory 23 notably comprises:
- in a register 230, the operating programme of the microprocessor 21 responsible for switching on the base station 2,
- the transmission parameters 231 (for example parameters for modulation, encoding, MIMO, recurrence of frames),
- the reception parameters 232 (for example parameters for modulation, encoding, MIMO, recurrence of frames),
- incoming data 233,
- coded data 234 for transmission of data,
- assignment parameters 235 of the base station to one or more mobile terminals (for example the number of assigned mobile terminals, the maximum number of base stations assigned, the quality of the link between the base station and the assigned mobile terminal, the efficiency in bitrate of the base stations, the localization of a mobile terminal) and
- parameters of the physical channel 236 (for example the assigning of determined time slots, of a code determined and/or intervals of sub-carriers determined at the transmission of the data by the base station 2)

According to a variant, the data representative of the assignment of the base station to a mobile terminal are transmitted regularly and/or on demand, for example by the base station or by a network server, to the neighbouring base stations carrying out a scanning in order to, for example determine the assignment parameters and decide an assignment to the mobile terminal according to the determined assignment parameters. According to a variant, the base station 2 comprises in the RAM a register corresponding to the geographical position of the mobile terminals.

The radio interface 26 is adapted for the reception of signals broadcast if necessary by the mobile terminals 1001, 1002 and 1003 of the system 1.

Figure 3:
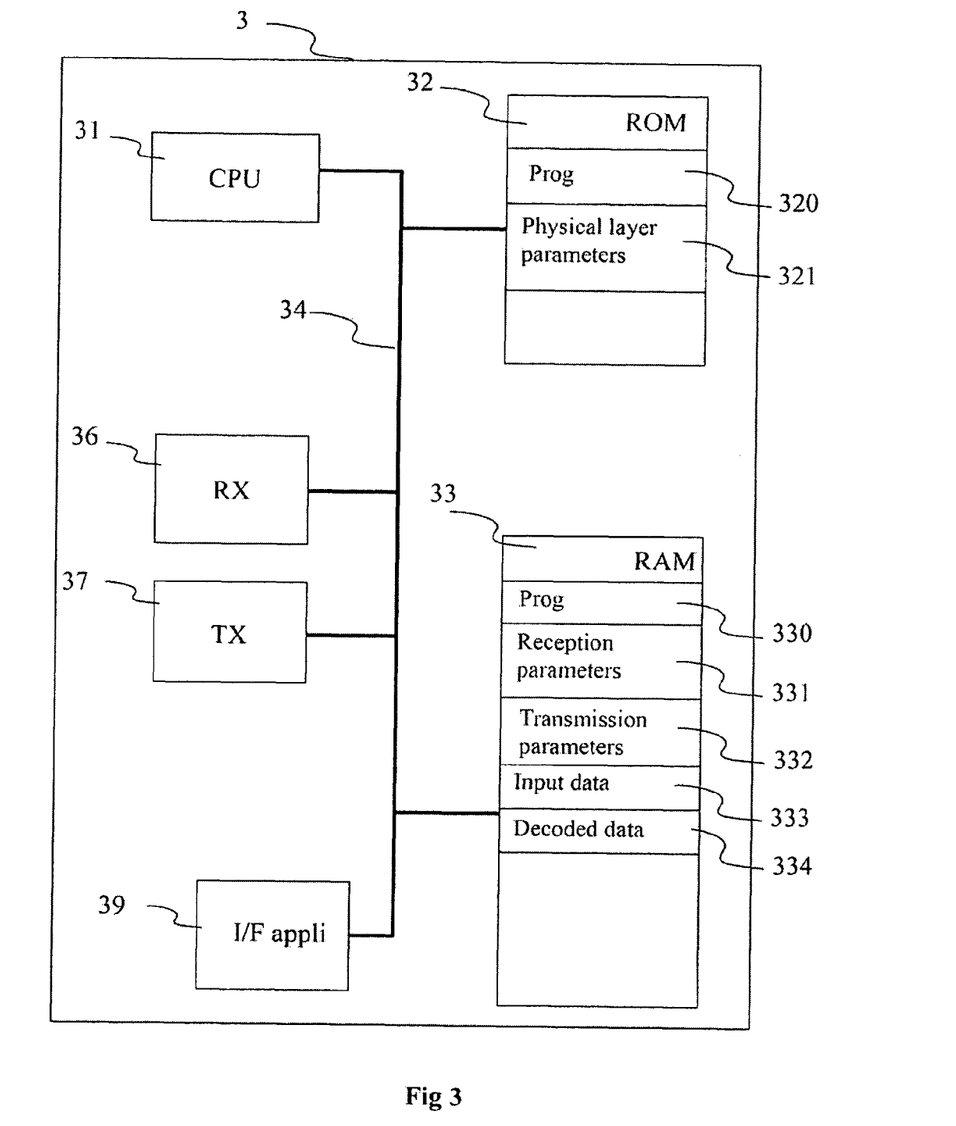

FIG. 3 diagrammatically illustrates a hardware embodiment of a mobile terminal 3 belonging to the system 1, corresponding for example to the mobile terminals 1001, 1002, 1003 and 1004 and adapted to receive and decode the signals transmitted by the base station 2.

The mobile terminal 3 comprises the following elements, connected to each other by a bus 34 of addresses and data, that also transports a clock signal:
- a microprocessor 31 (or CPU),
- a non-volatile memory of ROM (Read Only Memory) type 32,
- a Random Access Memory or RAM 33,
- a radio interface 36,
- an interface 37 adapted for the transmission of data, and an MMI interface 39 adapted for displaying information for a user and/or inputting data or parameters (for example the setting of sub-carriers and data transmitted).

It is noted that the word "register" used in the description of memories 32 and 33 designates in each of the memories mentioned, a memory zone of low capacity as well as a memory zone of large capacity (enabling a whole programme to be stored or all or part of the data representing data received and decoded).

The memory ROM 32 comprises in particular:
a "prog" 320 program, and
parameters 321 of physical layers.

The algorithms implementing the steps of the method specific to the invention and described below are stored in the ROM 32 memory associated with the mobile terminal 3 implementing these steps. When powered up, the microprocessor 31 loads and runs the instructions of these algorithms.

The random access memory 33 notably comprises:
in a register 330, the operating programme of the microprocessor 31 responsible for switching on the mobile terminal 3,
the reception parameters 331 (for example parameters for modulation, encoding, MIMO, recurrence of frames),
the transmission parameters 332 (for example parameters for modulation, encoding, MIMO, recurrence of frames),
incoming data 333 corresponding to the data received and decoded by the receiver 36, and
decoded data 334 formed to be transmitted at the interface to the application 39.

Other structures of the base station 2 and/or of the mobile terminal 3 than those described with respect to the FIGS. 2 and 3 are compatible with the invention. In particular, according to variants, the base stations and/or the mobile terminals compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements.

The radio interface 36 is adapted for the reception of signals broadcast by the base stations 101 to 107 of the system 1.

Figure 4:
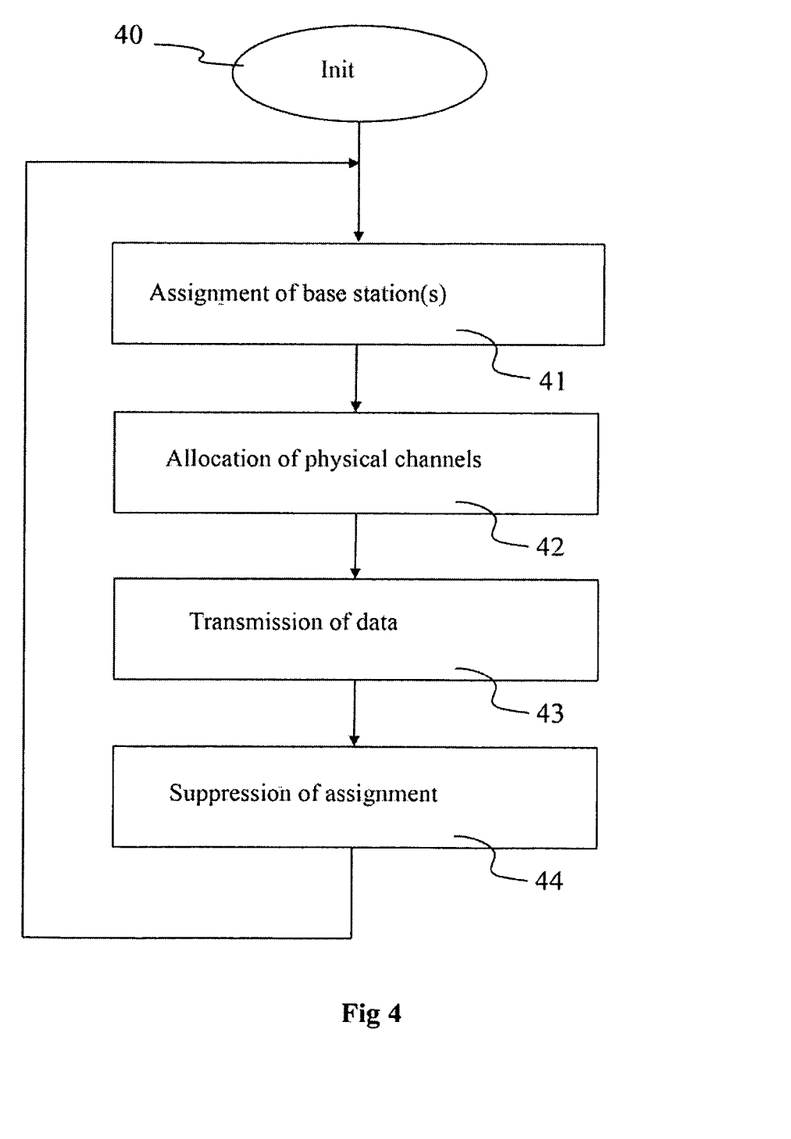
FIG. 4 shows a method for transmitting data according to a particular embodiment of the invention, implemented by a base station of the system in FIG. 1.

FIG. 4 shows a method for transmission of data implemented in two base station sub-sets each comprising at least two base stations 2, according to a particularly advantageous non-restrictive embodiment of the invention.

During an initialisation step 40, the various parameters of each base station are updated. In particular, the parameters corresponding to the signals to be transmitted or received and to the corresponding sub-carriers are initialised in any manner (for example, following the reception of initialisation messages transmitted by one of the base stations, known as master station or by a server not represented of system 1, or by operator commands).

Next, during a step 41, at least two base stations, for example three base stations 101, 102 and 107, carry out a first assignment to at least a first mobile terminal 1001. The three base stations 101, 102 and 107 thus assigned form a first sub-set S1. In parallel to this first assignment, at least two base stations, for example two base stations 106 and 107, carry out a second assignment to at least a second mobile terminal 1002. The two base stations 106 and 107 thus assigned form a second sub-set S2. At least one base station, for example the base stations 101 and 102, belonging to the first sub-set S1 do not belong to the second sub-set S2. At least one base station, for example the base station 106, belonging to the second sub-set S2 does not belong to the first sub-set S1. The first assignment of base stations varies over time, notably according to the movement of at least a first mobile terminal 1001, according to a first determined parameter. The second assignment of base stations also varies over time, notably according to the movement of at least a second mobile terminal 1002, according to a second determined parameter.

One advantage of such an implementation is that the mobile terminal does not carry out a "handover" process during its displacement. In fact, the sub-set of base stations assigned to a mobile terminal changes according to the displacement of the mobile terminal: a cell, qualified as a virtual cell, of base stations assigned to the mobile terminal is thus formed. The base stations forming such a virtual cell change according to the displacement of the mobile terminal as a function of the determined parameters and transmitting at a same frequency, this latter does not pass from one cell to another as it is the virtual cell that follows its displacement. The mobile terminal thus carries out no "handover" process to pass from one cell to another.

The first and second parameters both belong to a group of parameters. This group of parameters comprise the following parameters:

number of mobile terminals assigned to a base station to be assigned: if the number of mobile terminals to which are assigned a base station looking to be assigned to a new mobile terminal is less than a threshold value, then the assignment of a new mobile terminal is made, and if the number of mobile terminals to which are assigned the base station looking to be assigned to a new mobile terminal is greater than said threshold value, then the assignment of a new mobile terminal is not made. Non-restrictive examples for the threshold value are: 5, 10, 20, 50, 100, 200, 300, etc. mobile terminals in communication (that is to say terminals that receive and process data that are intended for them). According to a variant, the threshold value takes into consideration switched-off mobile terminals (that is to say terminals to which are assigned base stations but which are not in an active communication state, that is to say they are waiting for reception of data that are specifically intended for them) in addition to those in communication, for example 100, 500, 1000, etc. switched-off mobile terminals. According to a variant, the threshold value takes into consideration the resources (for example bandwidth requirements) necessary to each of the mobile terminals. The account taken of this parameter offers notably the advantage of not saturating the network and of guarantying a quantity of bandwidth sufficient for each assigned mobile terminal.

maximum number of base stations assigned to a mobile terminal: a maximum number of base stations that can be assigned to a given mobile terminal is fixed (for example 3, 4, 5, etc.) and a new base station looking to be assigned to the mobile terminal under consideration can only do so if the maximum number of base stations assigned to said mobile terminal being considered has not been reached. If the maximum number of assigned base stations has been reached, a new base station looking to be assigned to the mobile terminal being considered can only do so if the assignment of an assigned base station is suppressed. According to a variant, the maximum number of base stations assigned to a given mobile terminal is comprised between:

the loss in efficiency on the bandwidth of the network formed by the base stations: to minimise the loss in efficiency, it is necessary to limit the number of base stations, the gain in reception of the mobile terminal due to the gain in diversity obtained in multiplying the base stations transmitting the same data synchronously at a single frequency intended for the mobile terminal.

The account taken of this parameter offers notably the advantage of optimizing the utilization of base stations in avoiding that a too great number of base stations are assigned to a mobile terminal and enables for example to limit the number of base stations to be implemented in the network.

Link quality between the base station to be assigned and the mobile terminal being considered: the link quality is for example estimated from measurements of the signal power received by the base station and transmitted by the mobile terminal, measurements carried out according to any technique known in the prior art. Advantageously, the base station having the best level of reception of the signal transmitted by the mobile terminal is assigned preferentially to the mobile terminal being considered, there where the additional base station(s) to be assigned to the mobile terminal being determined by order of the falling level of reception of the signal (starting from the best level). According to a variant, a base station with a level of reception less than a threshold value (for example less than 10, 15 or 20 dB with respect to the level of reception of the best base station) is not assigned. According to another variant, the frequency of the measurements of power carried out by the base station(s) receiving the signal transmitted by the mobile terminal increase (respectively diminish) when the SNR (Signal to Noise Ratio) diminishes (respectively increase). The account taken of this parameter offers notably the advantage of assigning to a mobile terminal only the base stations for which the signal transmitted will be effectively received for processing by the mobile terminal.

Efficiency in bitrate of the base station to be assigned: if the bitrate offered by the base station to be assigned is greater than a threshold value, then the assignment is made, if not the assignment fails. According to a variant, the total bitrate of the network formed by the base stations is taken into account to assign a base station: a base station for which the bitrate is greater than the threshold value is not for example assigned because it is the only available to establish communication with another mobile terminal. The account taken of this parameter offers notably the advantage of guarantying a minimum bitrate to the mobile terminal.

Localisation of the mobile terminal being considered: the base station or base stations for which the distance(s) with respect to the mobile terminal being considered is/are less than a threshold value is/are assigned to said mobile terminal. In the case of a picocell system, the threshold value takes non-restrictively the values 50, 100 or 200 m for example. In the case of a femtocell system, the threshold value takes non-restrictively the values 5, 10 or 50 m for example. It is understood by mobile terminal localisation its absolute geographical position or relative geographical position (with respect to the base stations). The position is determined for example by GPS or by measurement of the distances between each base station and the mobile terminal from a signal transmitted by the mobile terminal and received by the base stations, according to any technique known in the prior art. The account taken of this parameter offers notably the advantage of simplicity in its implementation.

When the parameter used for an assignment is that corresponding to the number of mobile terminals assigned to a base station to be assigned, step 41 comprises the following steps:
test to determine the number of mobile terminals to which are assigned a base station,
comparison of the test result with a threshold value,
assignment of the base station to a new mobile terminal if the test result is less than the threshold value.

When the parameter used for an assignment is that corresponding to the maximum number of base stations assigned to a mobile terminal to be assigned, step 41 comprises the following steps:
first test to determine the number of base stations assigned to a mobile terminal,
comparison of the test result with the maximum numbers of base stations authorized that can be assigned to a mobile terminal,
assignment of a new base station to the mobile terminal if the test result is less than the maximum number authorized,
if the test result is equal to or superior to the maximum authorized number:
second test to determine if the assignment of an assigned base station is suppressed,
assignment of a new base station to the mobile terminal if the result of the second test is positive, that is to say if an assignment of an assigned base station was suppressed, assignment refused if the result of the second test is negative.

When the parameter used for an assignment is that corresponding to the link quality of base station to be assigned and the mobile terminal being considered, step 41 comprises the following steps:
estimation of the link quality between the mobile terminal and each base station to be assigned,
assignment of the base station whose link quality is the highest,
assignment in the contrary case of the base station whose link quality is the second highest,
repetition of the preceding step by descending order of link quality level.

According to a variant, step 41 comprises the following steps:
estimation of the link quality between the mobile terminal and each base station to be assigned,
assignment of the base station(s) for which the link quality is greater than a threshold value.

When the parameter used for an assignment is that corresponding to the bitrate efficiency of the base station to be assigned, step 41 comprises the following steps:
determination of the bitrate offered by the base station to be assigned,
assignment of the base station(s) for which the bitrate offered is greater than a threshold value.

When the parameter used for an assignment is that corresponding to the localisation of the mobile terminal being considered, step 41 comprises the following steps:
determination of the distance between the mobile terminal and the base stations,
assignment of the base station(s) for which the distance separating them from the mobile terminal is less than a threshold value.

According to a variant, the group of parameters only comprises a single or two or three or four or five of the parameters listed above. According to another variant, the first and second parameters are a combination of at least two parameters of the group of parameters defined above, for example a combination associating the link quality to the maximum number of base stations that can be assigned.

Advantageously, the first and second parameters are identical. According to a variant, the first and second parameters are different.

According to an embodiment, the first and second parameters are fixed in time and only correspond to the parameters of the invariable parameters group. According to another embodiment, the first and second parameters vary in time corresponding to one of the parameters of the group of parameters, then to another and again to another.

Advantageously, the first and/or second assignment(s) of a base station to respectively at least a first and at least a second mobile terminal is realized on the initiative of said base station. According to a variant, the first and/or second assignment(s) are realized on the initiative of a server of a network not shown in FIG. 1.

According to another embodiment, only two base stations are assigned to a mobile terminal as long as the level of the signal received by the base stations and transmitted by the mobile terminal is sufficient. When the level of reception diminishes, at least one of the assigned base stations transmits a request intended for adjacent base stations requesting that they also contribute to the communication with the mobile terminal, that is to say requesting them to assign to the mobile terminal to transmit data intended for this mobile terminal. The base stations detecting the mobile terminal thus transmitting a request to join the two base stations already assigned. Advantageously, if more than one base stations are candidates for assignment with the mobile terminal, that for which the value of the contribution in the signal received by the mobile terminal, the signal received by the terminal resulting from the combination of all the signals transmitted by the base stations that are assigned to it, is the greatest (that is to say whose value is highest) is retained, for example by a system server or by a master base station. The value of the contribution is for example the power of the received signal (for example the level of signal ratio to noise, the BER (Bit Error Rate) or the FER (Frame Error Rate)). The contribution in the received signal is determined according to any technique known in the prior art, for example by transmission of a particular signal by each base station on another frequency channel than that used for the transmission of data, or by application of a determined weighting coefficient specific to the signal transmitted by each base station that enables the mobile terminal to identify the base station transmitting a signal, as described in the French patent application unpublished and filed on 17 Oct. 2008 under the filing number FR0857057. Hence, when a mobile terminal distances itself from a base station, the virtual cell formed by the base stations that communicate with it extend progressively to the adjacent base stations.

Then, during a step 42, the first physical channels are assigned to the base stations of the first sub-set, that is to say that a communication between the base stations of the first sub-set on one side and a given first mobile terminal on the other side is established on the first physical channels, and the second physical channels, different to the first physical channels, are assigned to the base stations of the second sub-set, that is to say a communication between the base stations of the second sub-set on one side and a given second mobile terminal on the other side is established on the second physical channels. A physical channel is characterized by a group of parameters comprising a list of sub-carriers, a time slot, a level of interference and in the case of a CDMA (Code Division Multiple Access) access, a same spread code.

Advantageously, the base stations of the first sub-set and the base stations of the second sub-set do not use the same time slots for the transmission of "bursts" intended for mobile terminals through the application of TDMA (Time Division Multiple Access). The set of base stations transmit at a single frequency, it is therefore not possible to attribute a frequency per mobile terminal and the only attribution of a time slot per mobile terminal results in dividing the available bandwidth by the number of mobile terminals present in the network. In order to optimize the available bandwidth, it becomes necessary to use a same time slot for several mobile terminals while avoiding interferences. Referring to FIG. 1 which shows the interference zone of each base station, it is possible to construct the following table of interference between base stations, an interference between two base stations being indicated with an X:

TABLE 1

| Interferes with | BS1 | BS2 | BS3 | BS4 | BS5 | BS6 | BS7 |
|---|---|---|---|---|---|---|---|
| BS1 | X | X | | | | | X |
| BS2 | X | X | X | | | X | X |
| BS3 | | X | X | X | X | X | |
| BS4 | | | X | X | X | | |
| BS5 | | | X | X | X | X | |
| BS6 | | X | X | | X | X | X |
| BS7 | X | X | | | | X | X |

With regard to table 1, it is remarked for example, that BS1 interferes with BS2 and BS7. At the level of a time slot:
- either BS1 transmits the same data as BS2 and/or BS7,
- or BS1 transmits nothing while BS2 and/or BS7 transmit data.

According to an embodiment and in reference to FIG. 1 showing a system 1 with four sub-sets of base stations assigned to four mobile terminals, the construction of data frames, that is to say the allocation of time slots to sub-set of base stations assigned to each of the mobile terminals, is carried out in the following way:
- allocation of a first time slot TS1 to the sub-set S1 composed of base stations BS1, BS2 and BS7 assigned to mobile terminal MT1: these 3 base stations BS1, BS2 and BS7 transmit data intended for mobile terminal MT1, which excludes any transmission for BS3 and BS6 during this first time slot in compliance with table 1,
- allocation of a first time slot TS1 to the sub-set S3 composed of the base stations BS4 and BS5 assigned to the mobile terminal MT3, the base stations BS4 and BS5 interfering with none of the base stations of S1 i.e. BS1, BS2 and BS7,
- allocation of a second time slot TS2 to the sub-set S4 composed of base stations BS3, BS4 and BS5 assigned to mobile terminal MT4: these 3 base stations BS3, BS4 and BS5 transmit data intended for mobile terminal MT4, which excludes any transmission for BS2 and BS6 during this second time slot in compliance with table 1,
- no mobile terminal being assigned to only the base stations BS1 and BS7, the second time slot TS2 cannot be allocated to any other sub-set of base stations,
- allocation of a third time slot TS3 to the sub-set S2 composed of base stations BS1 and BS7 assigned to mobile terminal MT2: these 2 base stations BS6 and BS7 transmit data intended for mobile terminal MT2, which excludes any transmission for BS1, BS2, BS3 and BS5 during this third time slot in compliance with table 1, no mobile terminal being assigned to only the base station BS4, the third time slot TS3 cannot be allocated to any other sub-set of base stations, The same reasoning is reproduced for the remaining time slots.

A description of the start of the frame for the following base station BSi/time slot TSi pairs:

TABLE 2

| BSi | TSi | | | | |
|---|---|---|---|---|---|
| | TS1 | TS2 | TS3 | TS4 | ... |
| BS1 | MT1 | silence | silence | MT1 | ... |
| BS2 | MT1 | silence | silence | MT1 | ... |
| BS3 | silence | MT4 | silence | silence | ... |
| BS4 | MT3 | MT4 | silence | MT3 | ... |
| BS5 | MT3 | MT4 | silence | MT3 | ... |
| BS6 | silence | silence | MT2 | silence | ... |
| BS7 | MT1 | silence | MT2 | MT1 | ... |

According to another implementation, the construction of frames described in table 2 is combined with or replaced a scheduling method enabling an equitable division of system capacities, for example by allocation of a FIFO (First In First Out) queue to each data stream transmitted by each base station intended for a given mobile terminal. Such scheduling methods are for example WFQ (Weighted Fair Queuing) methods or WRQ (Weighted Round Robin).

According to a variant, the base stations of the first sub-set and the base stations of the second sub-set do not use the same sub-sets of sub-carriers for the transmission of "bursts" intended for each of the mobile terminals through the application of OFDMA (Orthogonal Frequency-Division Multiple Access). The construction of frames, that is to say the allocation of sub-carriers to the sub-sets of base stations assigned to each of the mobile terminals, is carried out according to the same reasoning as in TDMA in replacing the allocation of time slots by sub-carriers or sub-sets of sub-carriers.

According to another variant, the base stations of the first sub-set and the base stations of the second sub-set applying different codes to signals transmitted by the base stations intended for each of the mobile terminals by the application of a multiplexing by CDMA (Code Division Multiple Access) code. All the base stations of a same sub-set apply the same code. The construction of frames, that is to say the allocation of codes to the sub-sets of base stations assigned to each of the mobile terminals, is carried out according to the same reasoning as in TDMA in replacing the allocation of time slots by codes.

Advantageously, the physical channels allocated to each of the sub-sets of base stations of the system 1 are differentiated by combination of more than one of the techniques TDMA, OFDMA and/or CDMA. According to a variant, the account taken of interferences is used to differentiate the physical channels. Advantageously, the physical channels allocated to each of the sub-sets of base stations of the system 1 are defined in such a way that they do not overlap as described for example in the description of the allocation of time slots to sub-sets of base stations and in table 2.

During a step 43, each base station 101, 102 and 107 of the first sub-set S1 transmits the first specific data to the first mobile terminal 1001 synchronously (that is to say with a negligible temporal difference (for example less than 1 μs) and without temporal sliding of a signal transmitted by a base station with respect to another signal transmitted by another base station), at a same frequency (that is to say with a negligible frequency difference with regard to the system being considered (typically less than 1 Hz for a DVB-T type system), the first data being modulated with a same first modulation schema. In a similar way, each base station 106, 107 of the second sub-set S2 transmits the second specific data to the second mobile terminal 1002 synchronously, at a same frequency, the second data being modulated with a same second modulation schema. The transmission of the first data and the second data by respectively each of the base stations of sub-set S1 and each of the base stations of sub-set S2 is synchronized according to any methods known to those skilled in the art, such as for example GPS synchronization or automatic clock reference. The first and second modulation schemas including for example an external code (for example Reed Solomon), one or more time/frequency interleavers, an internal code (for example of convolutive type or Turbo Code or LDPC (Low Density Parity Check) and/or a mapper (for the conversion of data to signal) enabling the generation of point constellations (for example QPSK (Quadrature Phase Shift Keying, 16 QAM (Quadrature Amplitude Modulation, 64 QAM, etc.). Advantageously, an OFDM modulation is applied in combination with the techniques mentioned above to effectively process the echoes generated by the transmission of signals by a plurality of base stations.

According to a variant, the base stations of the system are of MIMO type and have more than one transmission antennas. The signals transmitted by each antenna of a MIMO base station are coded by a MIMO type coding, above the first and second modulation schemas, known to those skilled in the art (for example by integration of a (Alamouti type for example) STBC (Space Time Block Code) code and described in the document "Space-Time block codes from orthogonal designs" written by V. Tarokh, H. Jafarkhani and R. A. Calderbank and published in "IEEE Transactions on Information Theory" volume 45, pages 1456-1467, July 1999), or Golden Code (as described in the document "The Golden Code: A 2×2 Full-Rate Space-Time Code with Non-Vanishing Determinants" written by J.-C. Belfiore, G. Rekaya, E. Viterbo and published in "IEEE Transactions on Information Theory" volume 51, number 4 pages 1432-1436, April 2005) or by application of a spatial multiplexing (for example VBLAST ("Vertical Bell Laboratories Layered Space Time") as described in the document written by Gerard J Foschini (1996) entitled "Layered Space-Time Architecture for Wireless Communication in a Fading Environment When Using Multi-Element Antennas" and published in the technical journal of Bell laboratories of October in pages 41-59).

According to a specific mode of the invention and for each sub-set of base stations of system 1, at least one first base station transmits data coded via a first coder and at least a second base station transmits data, identical or not to that transmitted by the first base station, coded via a second coder different to the first coder. The data are transmitted synchronously and at a same frequency. The first and second base stations of a same sub-set function then as respectively a first antenna and a second antenna of a MIMO base station. Two such base stations of the same sub-set form a cooperative MIMO system.

According to a variant, the steps of allocation of physical channels 42 and of transmission 43 are reiterated successively without modification of assignment of base stations to the mobile terminals.

Finally, during a step 44, the assignment of a base station to a mobile terminal is suppressed according to a predetermined parameter. The suppression of the assignment of a base station from the first sub-set is carried out according to a first parameter and the suppression of the assignment of a base station of the second sub-set is carried out according to a second parameter.

Advantageously, the first and second parameters according to which are made the suppressions of assignments are identical to the first and second parameters according to which are made the assignments of base station(s) to the first and second sub-sets. According to a variant, the first and second parameters according to which are made the suppression of assignments are different to the first and second parameters according to which are made the assignments of base station(s) to the first and second sub-sets, all belonging to the group of parameters comprising the list of parameters defined and detailed above in the description of step 41.

Advantageously, the first and second assignment suppression parameters are identical. According to a variant, the first and second parameters are different.

According to a variant, in the case where more than two base stations are assigned to a mobile terminal, if two base stations detect a heightened reception level of a signal transmitted by the mobile terminal, these base stations transmit information intended for other assigned base stations (or a network server) to signal to them (respectively to it) that they (it) can initiate a suppression of assignment to the mobile terminal. This variant offers the advantage of optimizing the use of base stations and therefore optimizing the system resources.

Advantageously, the suppression of assignment of a base station to a mobile terminal is carried out on the initiative of the base station being considered. According to a variant, the suppression of the assignment is realized on the initiative of a network server not shown in FIG. 1.

Figure 5:
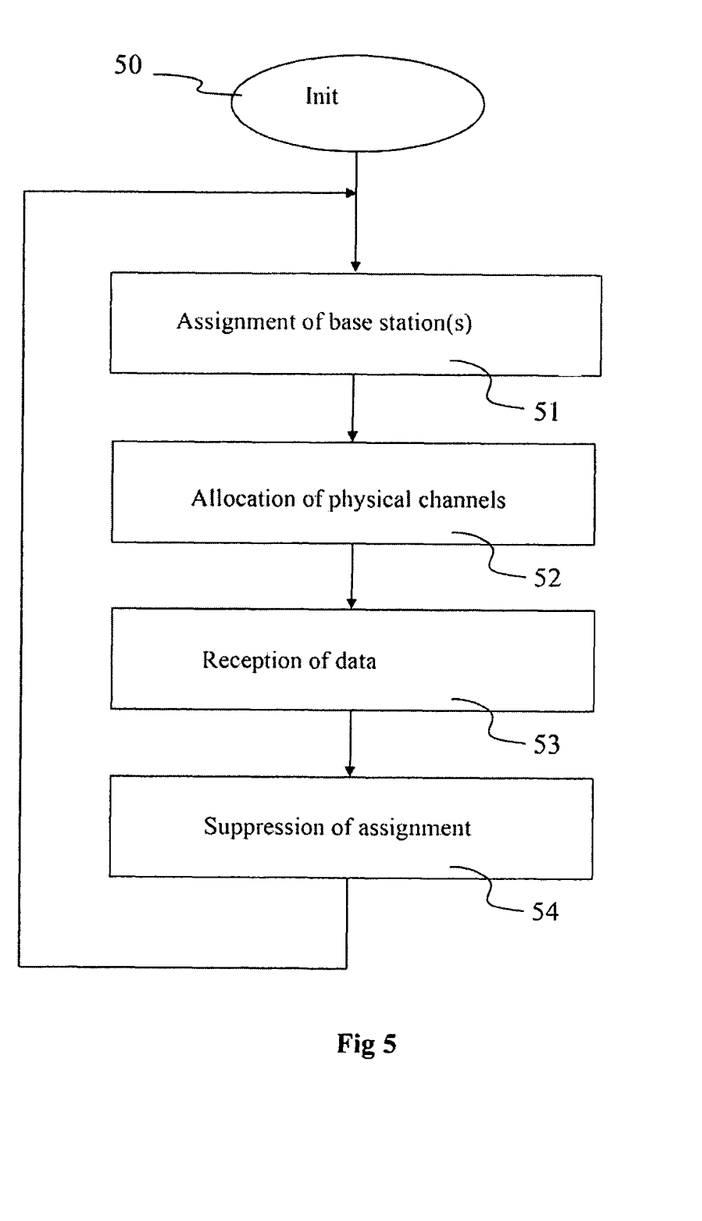
FIG. 5 shows a method for reception of data according to a particular embodiment of the invention, implemented by a mobile terminal of the system in FIG. 1.

FIG. 5 shows a method for reception of data implemented in two mobile terminals 3 within a system comprising two base station sub-sets each comprising at least two base stations 2, according to a particularly advantageous non-restrictive embodiment of the invention.

During an initialisation step 50, the various parameters of each mobile terminal are updated. In particular, the parameters corresponding to the signals to be transmitted or received and those of the corresponding sub-carriers are initialised in any manner (for example, following the reception of initialisation messages transmitted by one of the base stations, known as master station or by a server not represented of system 1, or by operator commands).

The steps 51 of assignment of base station(s), 52 of allocation of physical channels and 54 suppression of assignments are identical to respectively the steps 41 of assignment of base station(s), 42 allocation of physical channels and 44 suppression of assignment detailed in the description of FIG. 4 and will therefore not be repeated in the description of FIG. 5.

During a step 53, a first mobile terminal 1001 receives the first specific data, transmitted by each base station 101, 102 and 107 of the first sub-set S1 synchronously, at a same frequency and modulated by a same first modulation schema. In a similar way, a second mobile terminal 1002 receives the second specific data, transmitted by each base station 106, 107 of the second sub-set S2 synchronously, at a same frequency and modulated with a same second modulation schema.

According to a variant, at least one of the mobile terminals is of MIMO type and has more than one reception antenna.

Naturally, the invention is not limited to the embodiments previously described.

In particular, the invention is not limited to a system comprising two subsets of base stations but also extends to a system comprising more than two base station subsets. In the same way, a sub-set is indifferently defined by two base stations or more than two base stations. The invention is also not restricted to a system comprising two mobile terminals but also extends to a system comprising more than two mobile terminals. The assignment of base stations of a same sub-set is not restricted to one mobile terminal but also extends to a plurality of mobile terminals.

According to a variant, the assignment of a base station to a mobile terminal is carried out on the initiative of the mobile terminal. From a parameter such as for example the localisation of the receiver with respect to the base stations, the mobile terminal decides the assignment of such or such base station. According to a variant, the mobile terminal transmits information representative of the assignment of base stations intended for base stations and/or a network server. According to another variant, the quality of the link between a base station and a mobile terminal is determined by the mobile terminal.

According to another variant, the suppression of assignment of a base station to a mobile terminal is carried out on the initiative of the mobile terminal. From a parameter such as for example the localisation of the receiver with respect to the base stations, the mobile terminal decides the suppression of the assignment of such or such base station. Advantageously, the mobile terminal transmits information representative of the suppression of the assignment of the base station(s) intended for the base stations.

According to a variant, the assignment and/or suppression of the assignment of a base station to a mobile terminal is carried out according to the movements of the mobile terminal.

According to another variant, the data transmitted by a sub-set of base stations intended for a mobile terminal to which the base stations are assigned is a function of the base stations, thus enabling the broadcast of specific services intended for the mobile terminal, for example according to the geographical position of the base stations.

According to a variant, only one base station is assigned to one or more mobile terminals as long as the reception level of the signal transmitted by the mobile terminal is sufficient. When the reception level diminishes, the assigned base station transmits an alarm requesting adjacent base stations to also contribute to the communication with the mobile terminal.

According to an embodiment, the strategy of extension of virtual cells is paired with the management of transmission power and/or the reception of mobile terminals and base stations. For example, when a mobile terminal is only communicating with the two base stations that are assigned to it, the power of the mobile terminal and that of the base stations is adjusted in order to enable the communication to be made correctly but at minimum power. According to a variant, the transmission power of the base stations increases as the mobile terminal distances itself from the base stations. When the transmission power reaches a determined threshold value, at least one of the assigned base stations transmits a request intended for adjacent base stations so that these latter carry out a scanning to detect the mobile terminal. In the case of successful detection, at least one of the base stations detecting the mobile terminal performs an assignment to the mobile terminal to participate in the communication with the mobile terminal. According to a variant, the request relating to the realization of a scanning contains information relating to the physical channel to be scanned.

According to a variant, at least one of the base stations of the network transmits data at a frequency different to that of the other base stations of the network.

According to another variant, at least one of the base stations is mobile.

The invention claimed is:

1. A method for transmitting data in a wireless network-having a plurality of base stations and at least two mobile terminals, the plurality of base stations broadcasting data at a same frequency, wherein the method comprises the steps of:
   first assigning at least two base stations from among the plurality of base stations to at least a first mobile terminal,
   forming a first sub-set of assigned base stations, the first assigning varying in time according to a first determined parameter belonging to a group of parameters,
   second assigning, of at least two base stations from among the plurality of base stations to at least a second mobile terminal being different from the at least a first mobile terminal,
   forming a second sub-set of assigned base stations, at least one base station of the first sub-set belonging to the second sub-set, at least one base station of the first sub-set not belonging to the second sub-set, and at least one base station of the second sub-set not belonging to the first sub-set, the second assigning varying in time according to a second determined parameter belonging to a group of parameters,
   synchronized transmitting, by each base station of said first sub-set, of first specific data modulated with a same first modulation schema intended for said at least first mobile terminal,
   synchronized transmitting, by each base station of said second sub-set, of second specific data modulated with a same second modulation schema intended for at least a second mobile terminal; and
   allocating of first physical channels to the first sub-set and second physical channels to the second sub-set, the first and second physical channels being distinct, and wherein the first and second physical channels are determined according to the at least one base station belonging to the first sub-set and to the second sub-set.

2. The method according to claim 1, wherein the first and second physical channels do not overlap.

3. The method according to claim 1, wherein said first and second parameters belong to the group comprising: a number of assigned mobile terminals, a maximum number of assigned base stations, a link quality between a base station and the assigned mobile terminal, a bitrate efficiency of the base stations, and a localisation respectively of at least a first mobile terminal and at least a second mobile terminal.

4. The method according to claim 1, further comprising suppressing the assignment of at least one base station of the first sub-set according to the first parameter and/or at least one base station of the second sub-set according to the second parameter.

5. A method for receiving data in a wireless network having a plurality of base stations and at least two mobile terminals, the plurality of base stations broadcasting data at a same frequency, wherein the method comprises the following steps:
   first assigning at least two base stations from among the plurality of base stations to at least a first mobile terminal,
   forming a first sub-set of assigned base stations, the first assigning varying in time according to a first determined parameter belonging to a group of parameters,
   second assigning at least two base stations from among the plurality of base stations to at least a second mobile terminal being different from the at least a first mobile terminal,
   forming a second sub-set of assigned base stations, at least one base station of the first sub-set belonging to the second sub-set, at least one base station of the first sub-set not belonging to the second sub-set, and at least one base station of the second sub-set not belonging to the first sub-set, the second assigning varying in time according to a second determined parameter belonging to a group of parameters,
   receiving the first specific data by said at least first mobile terminal, transmitted synchronously and modulated with a same first modulation schema by each base station of said first sub-set,
   receiving the second specific data by said at least second mobile terminal, transmitted synchronously and modulated with a same second modulation schema by each base station of the second sub-set; and
   allocating first physical channels to the first sub-set and second physical channels to the second sub-set, the first and second physical channels being distinct, and wherein the first and second physical channels are determined according to the at least one base station belonging to the first sub-set and to the second sub-set.

6. The method according to claim 5, wherein the first and second physical channels do not overlap.

7. The method according to claim 5, wherein said first and second parameters belong to the group comprising: a number of assigned mobile terminals, a maximum number of assigned base stations, a link quality between a base station and the assigned mobile terminal, a bitrate efficiency of the base stations, and a localisation respectively of at least a first mobile terminal and at least a second mobile terminal.

8. The method according to claim 5, further comprising a step of suppressing the assignment of at least one base station of the first sub-set according to the first parameter and/or at least one base station of the second sub-set according to the second parameter.

* * * * *